United States Patent [19]

Johnson et al.

[11] 4,102,802
[45] Jul. 25, 1978

[54] PROCESS FOR SEPARATION AND RECOVERY OF CARBON MONOXIDE

[75] Inventors: Marvin M. Johnson; Donald C. Tabler, both of Bartlesville, Okla.

[73] Assignee: Phillips Petroleum Company, Bartlesville, Okla.

[21] Appl. No.: 791,443

[22] Filed: Apr. 27, 1977

Related U.S. Application Data

[62] Division of Ser. No. 618,721, Oct. 1, 1975, Pat. No. 4,042,669.

[51] Int. Cl.² .................. C10K 1/32; B01D 19/04
[52] U.S. Cl. .................................. 252/184; 55/68; 252/189; 423/236; 423/246; 423/247
[58] Field of Search ............... 252/184, 189; 423/246, 423/247, 235, 236, 415; 55/68

[56] References Cited

U.S. PATENT DOCUMENTS

| 2,580,527 | 1/1952 | Doringer | 423/246 |
| 3,006,729 | 10/1961 | Moore et al. | 423/236 |
| 3,026,172 | 3/1962 | Hirschbeck et al. | 423/246 |
| 3,415,615 | 12/1968 | Blytas et al. | 252/189 |
| 3,463,603 | 8/1969 | Freitas et al. | 55/68 |
| 3,630,676 | 12/1971 | Davis et al. | 423/246 |
| 3,658,463 | 4/1972 | Billings et al. | 423/246 |

Primary Examiner—Benjamin R. Padgett
Assistant Examiner—Irwin Gluck

[57] ABSTRACT

A process for the separation of carbon monoxide from mixed gases comprising contacting the mixed gases with an absorbent system consisting essentially of an inert diluent and a copper (I) salt of a sulfonic acid or of a dialkyl phosphate.

12 Claims, 1 Drawing Figure

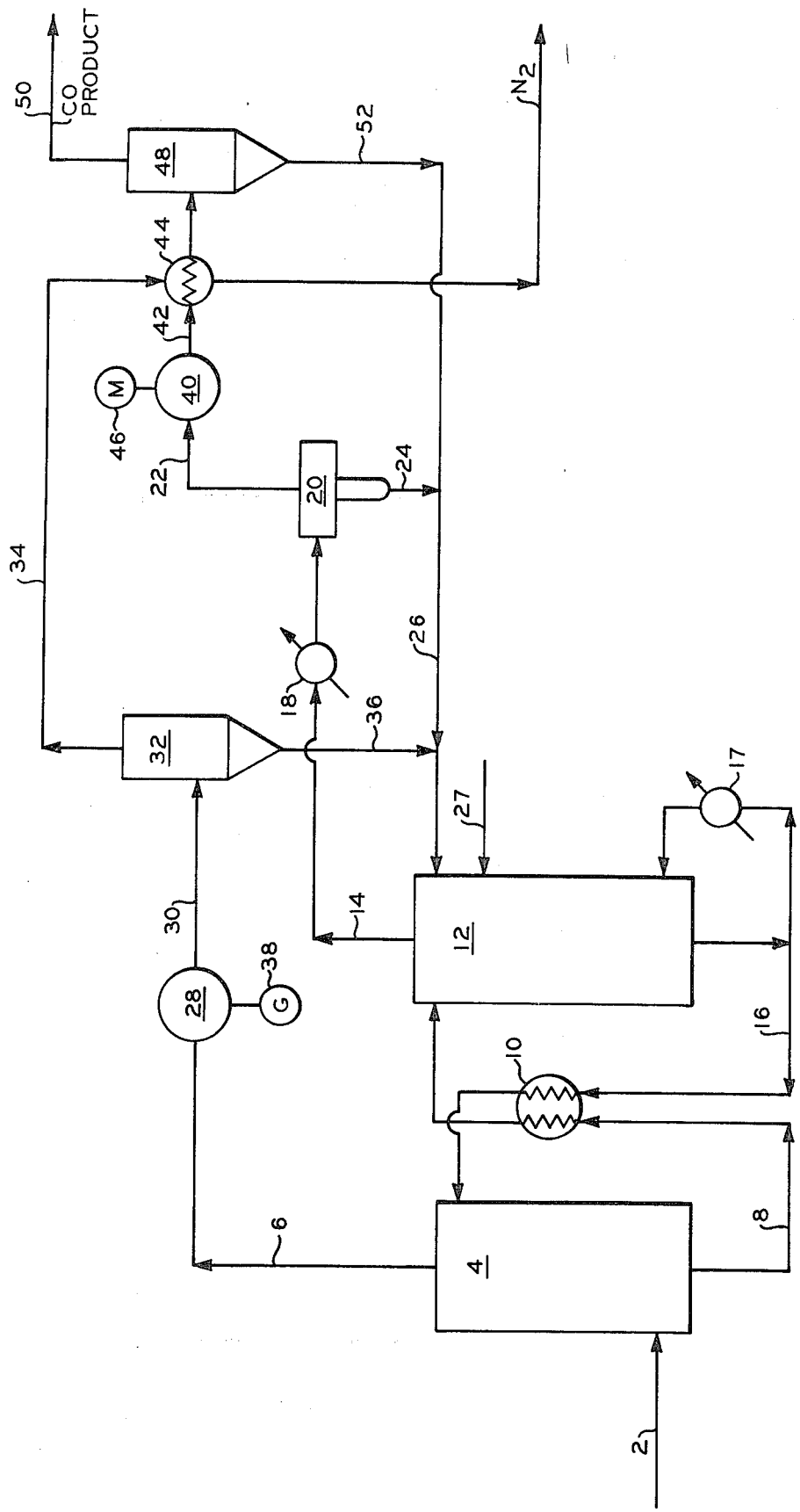

PROCESS FOR SEPARATION AND RECOVERY OF CARBON MONOXIDE

This is a division of application Ser. No. 618,721, filed Oct. 1, 1975, now U.S. Pat. No. 4,042,669.

This invention relates to the separation of carbon monoxide from a gas mixture. In one aspect the present invention relates to a novel carbon monoxide absorbent. In another aspect the present invention relates to the preparation of a carbon monoxide absorbent. In yet another aspect the present invention relates to a process for the separation of carbon monoxide from a gas mixture.

A variety of processes are known for the separation of carbon monoxide from gas mixtures. On the one hand, carbon monoxide is an undesirable component of some mixtures and must be removed. On the other hand, carbon monoxide is a potentially versatile intermediate for preparing a variety of clean burning fuels and large volume chemicals. Complex compounds of univalent copper and possibly other heavy metals suitable for forming complexes have been used for separating carbon monoxide. For this purpose, for instance, cuprous oxide, cuprous chloride, cuprous nitrate, cuprous carbonate, cuprous lactate, cuprous formate, or the univalent copper salts of other inorganic or organic carboxylic acids, are dissolved or suspended in aqueous solutions of the respective acids or water soluble salts of the same. Thus, for instance, cuprous chloride is dissolved in aqueous solutions of sodium chloride, calcium chloride, magnesium chloride, and the like, or in mixtures of such salts. The absorption of carbon monoxide in such absorption means is effected by washing the gas mixtures containing carbon monoxide in a known manner in absorption towers containing filling material, shower washers, and the like, at normal or increased pressure, and counterflow or uniflow or by bubbling the gas through the absorption means. These absorption means combine with carbon monoxide to form more or less unstable cuprous carbon monoxide complexes. The absorption means laden with carbon monoxide release the carbon monoxide in the form of gas, when heated, and/or when the pressure is reduced. Thus, the carbon monoxide can be recovered and the absorption means can be regenerated to be reused for absorption.

The cuprous ion has long been recognized as one of the few agents which complexes reversibly with carbon monoxide. Aqueous solutions of certain cuprous complexes have formed the basis of commercial carbon monoxide removal systems. However, these complexes are usually unstable, and require the continuous addition of reagents to maintain their composition and to maintain their absorptive capacity constant. Also, many of them are corrosive, requiring special materials of construction.

The absorptive capacity for carbon monoxide of many of these cuprous compounds is strongly influenced by temperature across the entire usable temperature range. Certain of the processes employing these cuprous compounds require, for example, that the absorptive step be carried out at a relatively low temperature and that the desorption step be carried out at a relatively high temperature. Thus, the energy requirement for separating carbon monoxide from gas mixtures by such processes can be excessive.

It is an object of this invention to provide a carbon monoxide absorbent composition.

It is another object of this invention to provide a process for the preparation of a carbon monoxide absorbent composition.

It is yet another object of this invention to provide an improved process for separating carbon monoxide from a gas mixture.

Other objects, aspects and advantages of the present invention will be apparent from the specification, appended claims and the drawing which is a flow diagram illustrating removal and recovery of carbon monoxide from a mixed feed stream.

In accordance with the present invention there is provided a carbon monoxide absorbent consisting essentially of an inert diluent and at least one copper(I) salt of an organic sulfonic acid or of a dialkyl phosphate, as hereinafter described.

Further in accordance with this invention, there is provided a process for the removal of carbon monoxide from a gas mixture containing same which comprises contacting such gas mixture in contacting zone with an absorbent consisting essentially of an inert diluent and at least one copper(I) salt of an organic sulfonic acid or of a dialkyl phosphate, as hereinafter described. Optionally, the carbon monoxide can be separated in a separating zone from the thus-formed absorbent carbon monoxide complex, and separately recovered.

The process of this invention is applicable to a variety of gas mixtures. The process can be used to remove carbon monoxide from town gas. The presence of a large amount of carbon monoxide in town gas makes it highly toxic to humans; for this reason, it is desirable to reduce the carbon monoxide content substantially. In making industrial gases, such as synthesis gas, carbon monoxide is generally produced as a co-product with hydrogen. However, many hydrogen-treating processes use metal catalysts that are poisoned by the presence of carbon monoxide. Therefore, it is necessary to purify the hydrogen by removing the carbon monoxide to prevent the poisoning of the catalysts. Such processes include ammonia synthesis and hydrorefining. In other processes, the industrial gases are utilized primarily for the carbon monoxide therein. Such processes include phosgene and acrylate synthesis, methanation and the like.

Of particular interest is the separation and concentration of carbon monoxide from a gaseous stream resulting from the oxidative gasification of coal or other carbonaceous material with a limited supply of oxygen. When air is used as the source of oxygen, the major separation is between carbon monoxide and nitrogen after the reaction water is condensed and the acid gases, i.e., carbon dioxide and hydrogen sulfide, are removed by conventional means using commercially available absorbents for this purpose. For example, the acid gases can be removed by scrubbing in a hot potassium carbonate solution or in solutions of mono- or diethanolamine. Any remaining sulfide can be removed by passing the scrubbed gas through fixed beds of hot alkalized iron or hot zinc oxide. Minor amounts of carbon dioxide remaining can be tolerated since this material is one of the products formed if the carbon monoxide is subsequently reacted with water over a supported nickel catalyst, for instance, to form methane and carbon dioxide as a step in the formation of synthetic natural gas.

The copper(I) salts employed in the present invention are selected from the group consisting of:

(a) the copper(I) salt of an alkane sulfonic acid having from 4 to 20 carbon atoms per molecule;

(b) the copper(I) salt of an aromatic sulfonic acid including hydroxyaromatic and haloaromatic sulfonic acids having from 6 to 22 carbon atoms per molecule;

(c) the copper(I) salt of a petroleum sulfonic acid; and (d) the copper(I) salt of a dialkyl phosphate having from 1 to 12 carbon atoms per alkyl member.

The alkane sulfonic acids useful in the practice of this invention can be straight chain or branched. Examples of suitable alkane sulfonic acids include n-butanesulfonic acid, 2-ethylhexanesulfonic acid, 2-methylnonanesulfonic acid, dodecanesulfonic acid, 2-ethyl-5-n-octyldecanesulfonic acid, n-eicosanesulfonic acid and the like. A presently preferred alkane sulfonic acid is 2-ethyl-1-hexanesulfonic acid.

The aromatic, hydroxyaromatic and haloaromatic sulfonic acids useful in the practice of this invention include benzenesulfonic acid, alkylbenzenesulfonic acids wherein the alkyl member contains from 1 to 16 carbon atoms, such as p-toluenesulfonic acid, p-dodecylbenzenesulfonic acid, p-hexadecylbenzenesulfonic acid, and the like, naphthalenesulfonic acids, phenolsulfonic acid, naphtholsulfonic acids and halo-benzenesulfonic acids, such as p-chlorobenzenesulfonic acid, p-bromobenzenesulfonic acid, and the like. A presently preferred aromatic sulfonic acid is p-dodecylbenzenesulfonic acid. Commercially available mixtures of o-, m- and p-dodecylbenzenesulfonic acid can be employed. Preferably, the mixture employed is predominately, i.e. 85–90 mole percent, the para isomer.

The petroleum sulfonic acids useful in the practice of this invention can be prepared from a deasphalted, solvent refined petroleum fraction having a viscosity of about 140 to about 720 SUS at 210° F (99° C). A presently preferred sulfonation stock is a propane-fractionated, solvent extracted dewaxed Mid-Continent oil of about 200 to 230 SUS at 210° F (99° C) and having a viscosity index of about 90 to 100, or higher. A Mid-Continent oil is more precisely defined as a mixed base or intermediate base oil in "The Science of Petroleum", volume 1, page 7, Oxford University Press, London, New York and Toronto, 1938. Such oil is, for example, sulfonated with a 10 percent $SO_3$-90 percent $SO_2$ mixture in a continuous operation substantially as described in U.S. Pat. No. 3,135,693 to Whitney et al, using an $SO_3$ to oil weight ratio of about 0.08 and a reaction temperature of about 115° F (46° C). The total reaction time is about 5 minutes, including the mixing and soaking periods. The system is maintained in the liquid phase at a pressure of 100–120 psig (689-827 kPa gage). Effluent from the reaction unit is subjected to a two-stage flash for $SO_3$-$SO_2$ removal.

The dialkyl phosphates useful in the practice of this invention include dimethyl phosphate, diethyl phosphate, di-n-butyl phosphate, di-2-ethylhexyl phosphate, di-n-dodecyl phosphate and the like.

The absorbent compositions of the present invention are prepared by refluxing a solution of the sulfonic acid or dialkyl phosphate in an inert diluent, as hereinafter described, together with cuprous oxide, with provision for removing the water of reaction, such as a Dean-Stark trap. The preparation is carried out in an oxygen-free inert atmosphere, such as under nitrogen. The molar ratio of acid to copper is about 1. The preparation is carried out for a time sufficient to produce substantially complete reaction. The copper(I) salts can, if desired, be separated from the diluent by removing the diluent as by vacuum distillation.

The diluents useful in the present invention include normally liquid saturated aliphatic, saturated cycloaliphatic or aromatic hydrocarbons, preferably boiling in the approximate range of 60° to 150° C, such as n-hexane, n-octane, cyclohexane, benzene, toluene, the xylenes, ethylbenzene, and the like; halogenated hydrocarbons such as chloroform and chlorobenzene; ethylene glycol ethers such as ethylene glycol monoethyl ether; and tetramethylene sulfone. Presently preferred diluents are toluene and the xylenes. Mixtures of the above can also be employed as diluents.

It is desirable to have as much of the copper(I) salt in the absorbent system as possible; the higher the salt/diluent ratio, the greater will be the complexing capacity of the system, and the greater the amount of carbon monoxide that can be complexed. Broadly, the amount of the copper(I) salt in the diluent will be an effective amount, i.e., an amount sufficient to complex at least a portion of the carbon monoxide in the gas mixture to be treated. In general, the amount of the copper(I) salt can range from 0.1 to 2 moles per liter of diluent. Salt/diluent molarities of at least 0.5 mole of salt per liter of diluent have given highly satisfactory results. However, at a nominal molarity of about 2 or more, the solution viscosity can increase enough to cause pumping difficulties, and such viscous solutions are preferably avoided.

The temperature at which the carbon monoxide is absorbed by the absorbent system is not critical. The absorption can be carried out at a temperature in the approximate range of 0° C to about 10° C below the boiling point of the diluent. It is presently preferred to carry out the absorption step at a temperature in the approximate range of 20° C to about 25° C below the boiling point of the diluent.

The absorption step can be carried out at subatmospheric, atmospheric or superatmospheric pressures. Carbon monoxide partial pressures between 0.1 and 20 atmospheres can be employed, preferably between 1 and 10 atmospheres. The particular partial pressure employed will generally be governed to some extent by the pressure at which the gaseous feed is supplied.

Once the absorption step has been completed, the carbon monoxide/-absorbent complex is passed to a desorption means wherein the carbon monoxide is liberated by heating the mixture to a temperature in the approximate range of 10° C below the boiling point of the diluent to the boiling point of the diluent. It is presently preferred that the desorption step be carried out at the boiling point of the diluent.

The desorption step can be carried out at subatmospheric, atmospheric or superatmospheric pressures. Absolute pressures in the approximate range of 0.1 to 3 atmospheres, preferably from 0.5 to 2 atmospheres, can be employed.

Referring now to the drawing, a feed stream containing carbon monoxide is fed by way of conduit 2 to an absorbing means 4, wherein the feed stream is contacted with the absorbent of the present invention. The absorbing means 4 can be of the conventional bubble tray type, a packed column or any other liquid-gas contacting apparatus. Prior to introduction of the feed into the absorbing means, the feed can be passed into a guard chamber (not shown) which will serve to remove materials that can interfere with the main absorption process, i.e., water, oxygen and hydrogen sulfide. Accordingly, the guard chamber can contain an absorbent material different from that present in the absorbing zone 4.

Line 6 at the top of the absorption zone 4 permits removal of the gas of reduced carbon monoxide content. Line 8 at the bottom of the absorption zone 4 conducts the carbon monoxide-enriched absorbent out of the absorbing zone 4, through heat exchanger 10 to the desorption zone 12.

In the desorption zone 12, the carbon monoxide-enriched absorbent is heated to liberate the carbon monoxide which is withdrawn from the top of zone 12 through line 14. The thus-regenerated absorbent is withdrawn from the bottom of the desorption zone 12 through line 16, passed through heat exchanger 10 where it transfers some of its heat to the material in line 8, and is then returned to absorber zone 4. A portion of the absorbent in line 16 is passed through reboiler 17.

The carbon monoxide in line 14 can contain a small amount of gaseous diluent. This material is passed through a heat exchanger 18 to cool the combined gaseous stream to condense the diluent, thence into a first separating zone 20 wherein the carbon monoxide is separated from the now liquid diluent. Carbon monoxide is withdrawn from the separating zone 20 through line 22. The diluent is withdrawn from the separating zone 20 through line 24 and returned to the desorbing zone 12 through line 26. The absorbent in the system is replenished, as necessary, through line 27.

In one embodiment of this invention the feed stream consists essentially of carbon monoxide and nitrogen. Such a feed stream results from the oxidative gasification of a carbonaceous material, such as coal, when air is used as the source of oxygen. The separated nitrogen withdrawn from absorbing zone 4 through line 6 is passed to expansion motor 28. As the nitrogen passes through the absorbing zone 4, it can carry over a small amount of diluent, in the gaseous form. The diluent/nitrogen gases in line 6 are expanded in turbo or reciprocating expansion motor 28 under substantially adiabatic conditions. The resultant gas mixture must be at a temperature and pressure which will cause the diluent substantially to condense. The resultant cold gas mixture flows through line 30 to separator 32 where an overhead nitrogen stream is removed through line 34 and a liquid diluent stream is removed through line 36. The liquid diluent in line 36 can be passed to desorption zone 12 through line 26.

The expander motor 28 can provide mechanical energy or it can be connected to an electrical generator 38 to provide electrical energy.

The carbon monoxide in line 22 can be compressed in turbo or reciprocating compressor 40. The compressed carbon monoxide in line 42 can be passed through heat exchanger 44 which can be cooled by the cool nitrogen in line 34.

The compressor 40 is driven by motor 46. At least a portion of the energy requirement of motor 46 can be provided by the generator 38.

The compressed, cooled carbon monoxide exiting from heat exchanger 44 is passed through a separator 48 to remove any diluent that may have been condensed in the compressor 40 and/or cooler 44. The carbon monoxide is withdrawn from separator 48 through line 50. The separated diluent is withdrawn through line 52 and passed to line 26 to be returned to the desorber zone 12.

An advantage of the present invention is that the carbon monoxide absorptive capacity of the copper(I) compounds of this invention are not markedly influenced by temperature, up to the temperature at which the carbon monoxide begins to desorb. Hence, the absorber unit can be operated at a temperature slightly below the desorption temperature of carbon monoxide and the desorber unit can be operated at or somewhat above such temperature. Thus, the energy requirements for separating and recovering carbon monoxide according to this invention are reduced.

Another advantage of the present invention is the relatively low corrosion rate of the copper(I) compounds of this invention. For example, corrosion studies conducted at the boiling point of copper(I) dodecylbenzene sulfonate in toluene at a nominal molarity of 0.9 showed a corrosion rate, in mils per year, of 62.6 for carbon steel, 4.4 for 410 stainless steel and negligible for 304 stainless steel.

A further advantage of the present invention is that the copper(I) compounds of this invention can be easily regenerated should they be deactivated by water or oxygen. Should the copper(I) compound be hydrolyzed to cuprous oxide and the free acid, the reaction can be reversed by distilling off the water. Should the copper(I) compound be oxidized by oxygen to the copper(II) compound, the latter compound can be reduced with hydrogen to form the copper(I) compound.

The following examples illustrate the invention:

EXAMPLE I

A number of copper(I) compounds were prepared by boiling a solution of the corresponding sulfonic acid or phosphate in the chosen solvent together with cuprous oxide, under reflux with provision for removing the water of reaction. A nitrogen purge was used throughout each preparation to exclude oxygen. The molar ratio of acid to copper in each preparation was about 1.

These various copper(I) compounds were tested for carbon monoxide absorption. The results are shown in Table I below:

Table I

| Carbon Monoxide Absorption in Various Cu(I) Compounds | | | | | | | |
|---|---|---|---|---|---|---|---|
| Cu(I) Compound | Diluent | Solubility[1] | Molarity[2] | Absorption Temperature (° C) | Vol. CO (STP)/ Vol. Absorbent | Gm-Moles CO/ Gm-Atom Cu | Relative Rate of Absorption |
| Copper(I) dodecylbenzenesulfonate | Toluene | So | 1 | 25 | 15.9 | 0.71 | Very fast |
| Copper(I) 2-ethyl-1-hexanesulfonate | Toluene | So | 1 | 25 | 14.3 | 0.64 | Very fast |
| Copper(I) phenolsulfonate | Sulfolane | So | 1 | 25 | 9.0 | 0.48 | Fast at first, then slow |
| Copper(I) toluenesulfonate | Toluene | Sl | 0.5 | 25 | 3.5 | 0.31 | Moderately fast |
| Copper(I) 1-hydroxypropane-3-sulfonate | Toluene | I | 1 | 25 | 0 | 0 | — |
| Copper(I) naphthalenesulfonate | Cellosolve | Sl | 1 | 25 | 8.5 | 0.38 | Slow |
| Copper(I) p-chloro- | Chloroform+ | Sl | 1 | 25 | 5.4 | 0.24 | Very slow |

Table I-continued

Carbon Monoxide Absorption in Various Cu(I) Compounds

| Cu(I) Compound | Diluent | Solubility[1] | Molarity[2] | Absorption Temperature (° C) | Vol. CO (STP)/ Vol. Absorbent | Gm-Moles CO/ Gm-Atom Cu | Relative Rate of Absorption |
| --- | --- | --- | --- | --- | --- | --- | --- |
| benzenesulfonate | Toluene | | | | | | |
| Copper(I) 1-amino-2-naphthal-4-sulfonate | Water | Sl | 0.5 | 25 | 0 | 0 | — |
| Copper(I) p-amino benzenesulfonate | Water | D | 0.5 | 25 | 0 | 0 | — |
| Copper Fatty alcohol sulfate | Water | D | 0.5 | 25 | 0 | 0 | — |
| Copper(I) bis(2-ethylhexyl) phosphate | n-Octane | So | 0.5 | 25 | 1.4 | 0.122 | Moderately fast at first, then slow |
| Copper(I) butane-sulfonate | p-Xylene | Sl | 1.0 | 25 | 9.4 | 0.42 | Very slow |
| Copper(I) pentane-sulfonate | p-Xylene | Sl | 0.5 | 25 | 7.2 | 0.65 | Very slow |
| Copper(I) hexane-sulfonate | p-Xylene | Sl | 0.366 | 25 | 4.3 | 0.53 | Very slow |
| Copper(I) heptane-sulfonate | p-Xylene | Sl | 0.48 | 25 | 7.2 | 0.67 | Very slow |

[1]Indicates solubility of the copper(I) compound in the diluent shown, according to the following key: So — soluble; Sl — slurry; D — the Cu(I) compound disproportionated into copper and Cu(II) salt of the organic cpd.
[2]Nominal molarity of the Cu(I) compound in the diluent in moles of compound per liter of diluent.

Inspection of the results shows best absorption is obtained when the copper compound is completely soluble in the solvent. This is based on gram-moles carbon monoxide absorbed per gram-atom copper in the copper compound and the faster rate of absorption. The data show the best copper compounds to be those prepared from dodecylbenzenesulfonic acid and 2-ethyl-1-hexanesulfonic acid. The most preferred copper compound is copper(I) dodecylbenzenesulfonate in view of the results obtained and of the ready availability of the sulfonic acid.

EXAMPLE II

The ratio of cuprous oxide and dodecylbenzenesulfonic acid was varied in several preparations to determine what effect it and the concentration of the resulting copper(I) compound had on absorption capacity. The compounds were prepared in the manner of Example I using toluene or p-xylene as the solvent. The results are presented in Table II.

Table II

Factors Affecting Preparation of Copper(I) Dodecylbenzenesulfonate

| Run | Solvent | Nominal Molarity[1] | Acid/Copper Ratio[1] | CO Absorption STP Vol./ Vol. Absorbent | gm-Mole CO / gm-Atom Cu[1] |
| --- | --- | --- | --- | --- | --- |
| 1 | Toluene | 0.5 | 1.25 | 8.1 | 0.72 |
| 2 | " | 0.5 | 1.53 | 9.0 | 0.81 |
| 3 | " | 0.5 | 2.0 | 8.8 | 0.79 |
| 4 | " | 0.835 | 1.0 | 10.1 | 0.54 |
| 5 | " | 1.0 | 1.23 | 15.9 | 0.71 |
| 6 | " | 1.0 | 1.50 | 15.4 | 0.69 |
| 7[2] | " | 1.0 | 1.02 | 20.2 | 0.90[3] |
| 8 | p-Xylene | 1.0 | 1.01 | 19.3 | 0.86[3] |

[1]Based on amount of $Cu_2O$ charged at the start of the preparation.
[2]Fresh, laboratory-prepared $Cu_2O$ was used in this preparation. Commercially obtained $Cu_2O$ was used in all other cases.
[3]When allowance is made for the small amount of unreacted $Cu_2O$ remaining in the preparation flask the ratio of $CO/Cu^+$ closely approaches 1.

The data show it is preferable to use an acid/copper ratio of about 1 in preparing the copper compound as runs 5–8 most clearly demonstrate. As the copper concentration in the diluent increases the amount of carbon monoxide absorbed also increases. When the nominal molarity of the copper is about 1, which is preferred because the resulting solution viscosity is easily handled in a cyclic absorption-desorption process, the ratio of absorption of gram-moles carbon monoxide per gram-atom copper is estimated to approach unity.

The effectiveness of copper(I) dodecylbenzenesulfonate to segregate carbon monoxide from nitrogen is shown in this calculated example.

Referring to the drawing, a mixture of 95.1 mole percent nitrogen and 4.9 mole percent carbon monoxide, representing a combustion gas previously stripped of water, hydrogen sulfide and carbon dioxide, is passed to absorber tower 4 through line 2 at 280,000 cu. ft./hr. (7727 m³/hr) (2.07 MPa). The tower 4 has 15 trays and has a diameter of 48 inches (1.2 m).

5,400 Gal./hr. (20.44 m³/hr) of the copper(I) dodecylbenzenesulfonate absorbent as a 0.9 molar solution in p-xylene are introduced to tower 4 through conduit 16 at a temperature of about 165° F (74° C). The gases are contacted within tower 4 with the absorbent solution. It is assumed that the absorbent solution, at saturation conditions, absorbs 19 volume of carbon monoxide per volume of absorbent solution at a temperature of 165° F (74° C).

Nitrogen, containing 0.5 ppm CO, is withdrawn from the absorber tower 4 through conduit 6 at a rate of 266,280 cu. ft./hr. (7538 m³/hr).

The CO-saturated absorbent solution is withdrawn from tower 4 through line 8, passed through heat exchanger 10 and thence to the desorbing tower 12. The tower 12 has 15 trays and has a diameter of 48 inches (1.2 m). The liquid contents of tower 23 are heated to a temperature of 231° F (110° C). For this purpose, steam is supplied to the reboiler at 1372 lbs./hr. (622 kg/hr). Carbon monoxide is withdrawn from the desorbing tower 12 through line 14 at 13,720 cu. ft./hr. (622 m³/hr). The regenerated absorbent solution is withdrawn from tower 12 through line 16, passed through the heat exchanger 10 and then through a cooler, not shown, before being returned to the absorbing tower 4.

Reasonable variations and modifications, which will be apparent to those skilled in the art, can be made in this invention without departing from the spirit and scope thereof.

What is claimed is:

1. A composition of matter suitable for the absorption of carbon monoxide from a gas mixture containing same which consists essentially of a normally liquid hydrocarbon diluent having a boiling point in the approximate range of 60° to 150° C and at least one copper(I) salt selected from the group consisting of
    (a) the copper(I) salt of an alkane sulfonic acid having from 4 to 20 carbon atoms per molecule;
    (b) an aromatic sulfonic acid having from 6 to 22 carbon atoms per molecule;
    (c) the copper(I) salt of a petroleum sulfonate acid; and
    (d) the copper(I) salt of a dialkyl phosphoric acid having from 1 to 12 carbon atoms per alkyl member; wherein said copper(I) salt is present in said diluent in an amount ranging from 0.1 to 2 moles per liter of said diluent.

2. The composition of claim 1 wherein said diluent is selected from the group consisting of saturated aliphatic, saturated cycloaliphatic and aromatic hydrocarbons.

3. The composition of claim 2 wherein said salt is the copper(I) salt of p-dodecylbenzenesulfonic acid.

4. The composition of claim 2 wherein said salt is the copper(I) salt of 2-ethyl-1-hexanesulfonic acid.

5. The composition of claim 2 wherein said diluent is toluene.

6. A process for the preparation of a carbon monoxide absorbent consisting essentially of a normally liquid hydrocarbon diluent having a boiling point in the range of 60°–150° C and an amount effective to complex carbon monoxide of at least one copper(I) salt of a compound selected from the group consisting of:
    (a) an alkanesulfonic acid having from 4 to 20 carbon atoms per molecule;
    (b) an aromatic sulfonic acid having from 6 to 22 carbon atoms per molecule;
    (c) a petroleum sulfonic acid; and
    (d) a dialkyl phosphate having from 1 to 12 carbon atoms per alkyl member which comprises admixing said sulfonic acid or said dialkyl phosphate with copper(I) oxide in said diluent and heating the resulting mixture to remove the water of reaction, said process being carried out in an inert atmosphere for a time sufficient to produce substantially complete reaction and thereafter recovering said copper(I) salt in said diluent as the product of the process.

7. The process of claim 6 wherein said compound is 2-ethyl-1-hexanesulfonic acid.

8. The process of claim 6 wherein said compound is p-dodecylbenzene-sulfonic acid.

9. The process of claim 6 wherein said diluent is toluene.

10. The process of claim 6 wherein said copper(I) oxide and said sulfonic acid or said dialkyl phosphate are admixed in a molar ratio of about 1.

11. The process of claim 6 wherein the resulting absorbent contains said copper(I) salt in an amount ranging from 0.1 to 2 moles per liter of said diluent.

12. The process of claim 6 wherein said diluent is selected from the group consisting of saturated aliphatic, saturated cycloaliphatic and aromatic hydrocarbons.

* * * * *